United States Patent [19]
Iguchi

[11] Patent Number: 5,628,500
[45] Date of Patent: May 13, 1997

[54] CLAMPING APPARATUS FOR A COIL

[75] Inventor: Mikio Iguchi, Himeji, Japan

[73] Assignee: Mitsubishi Denki Kabushiki Kaisha, Tokyo, Japan

[21] Appl. No.: 497,107

[22] Filed: Jun. 30, 1995

[51] Int. Cl.$^6$ ............................................. B25B 1/20
[52] U.S. Cl. ........................... 269/37; 269/50; 269/71; 269/227; 269/296
[58] Field of Search ........................... 269/37, 47, 48.1, 269/49, 50, 51, 52, 53, 55, 56, 57, 71, 227, 296, 299, 320, 329, 48.2; 279/114, 106, 117, 141

[56] References Cited

U.S. PATENT DOCUMENTS

| | | | |
|---|---|---|---|
| 1,594,716 | 8/1926 | Forkardt | 279/114 |
| 2,271,012 | 1/1942 | Hutchings | 269/48.2 |
| 3,026,128 | 3/1962 | Willis | 279/114 |
| 3,061,936 | 11/1962 | De Dobbeleer | 269/71 |
| 3,216,717 | 11/1965 | Bagge et al. | 269/47 |
| 5,067,696 | 11/1991 | Morley | 269/49 |

*Primary Examiner*—Robert C. Watson
*Assistant Examiner*—Thomas W. Lynch
*Attorney, Agent, or Firm*—Sughrue, Mion, Zinn, Macpeak & Seas

[57] ABSTRACT

A clamping apparatus for a coil can exactly position a plurality of pre-assembled U-shaped wires at predetermined locations and clampingly hold their positions in a precise manner with extreme ease to thereby ensure smooth insertion of the wires into an iron core while avoiding inadvertent deformations of or damage to the wires upon assembly. A plurality of clamp pins are disposed on the support disk for rotation relative thereto and spaced from each other with predetermined circumferential intervals, each of the clamp pins being movable in a radial direction of the support disk and having a tapered tip end directed toward the central axis of the support disk. Each of the tip ends has two pairs of engagement grooves formed therein. A first drive mechanism drives the clamp pins to move in a direction radially of the support disk by a predetermined radial distance whereby the tapered tip end of each clamp pin is adapted to move into or out of adjacent ones of the U-shaped winding wires. A second drive mechanism drives the clamp pins to rotate around their longitudinal axis by a predetermined rotational angle whereby the engagement grooves in each clamp pin are adapted to engage corresponding U-shaped winding wires to fixedly clamp them.

19 Claims, 4 Drawing Sheets

CLAMPING APPARATUS FOR A COIL

BACKGROUND OF THE INVENTION

The present invention relates to a clamping apparatus for a coil such as an electromagnetic coil which is adapted to clamp the coil for assembling it with an iron core.

Conventionally, a coil in the form of an electromagnetic coil such as an armature coil having a plurality of a generally U-shaped winding wires has been used for a starter motor for a vehicle. An example of such a coil is shown in FIG. 7 in which a plurality of conductive or winding wires 1 in the form of U-shaped copper wires are arranged in a side-by-slide overlapped relation with respect to each other in such a manner that they have radially inner legs 1a disposed to form an inner circle and radially outer legs 1b disposed to form an Outer circle concentric with the inner circle, as illustrated in FIG. 6. The thus pre-assembled coil is then assembled into an iron core (not shown) with their wire legs 1a, 1b inserted into corresponding coil slots formed in the iron core. In this case, upon assembly of the pre-assembled U-shaped wires, it is necessary to hold the pre-assembled U-shaped wires 1 in a precise form or at a precise position in order to allow smooth insertion of their legs 1a, 1b into the corresponding coil slots in the iron core.

To this end, a clamping apparatus has conventionally been used for firmly holding the inner and outer legs 1a, 1b of the U-shaped wires 1 at their precise locations.

Illustrated in FIG. 6 is one example of a conventional damping apparatus which includes a plurality of clamp pins 105 radially disposed in a circumferentially spaced-apart relation with respect to each other. Each of the clamp pins 105 has a conical tip portion which is adapted to be inserted from the radially outer side into adjacent inner and outer legs 1a, 1b of the U-shaped wires 1 so as to clampingly hold the inner and outer legs 1a, 1b between two adjacent conical tip portions of the clamp pins 105. In this regard,-however, the inner and outer legs 1a, 1b are merely clamped between two adjacent clamp pins 105 with a wedging action of the conical tip portions or frictional forces produced by the conical tip portions abutting against the inner and outer legs 1a, 1b of the U-shaped wires 1. Owing to this arrangement as well as other causes such as fine surface irregularities of the conical tip portion, variations in the conical angle thereof and the like, the inner and outer legs 1a, 1b of the wires 1 are not only difficult to exactly position but also liable to inadvertently displace relatively, easily, so the wire legs 1a, 1b upon insertion into the coil slots in the iron core may be subject to undesirable deformations and resultant damage. As a result smooth insertion of the wire legs 1a, 1b into the slots in the iron core becomes sometimes difficult, thus reducing assembling efficiency of the coil wires.

SUMMARY OF THE INVENTION

In view of the above, the present invention is intended to overcome the above-mentioned problems encountered with the conventional clamping apparatus, and has for its object the provision of a novel clamping apparatus for a coil which can exactly position a plurality of pre-assembled U-shaped wires at predetermined locations and clampingly hold their positions in a precise manner with extreme ease to thereby ensure smooth insertion of the wires into an iron core while avoiding inadvertent deformations of or damage to the wires upon assembly.

According to the present invention, there is provided a clamping apparatus for a coil having a plurality of generally U-shaped winding wires comprising: a support disk having a central axis; a plurality of clamp pins disposed on the support disk for rotation relative thereto and spaced from each other with predetermined circumferential intervals, each of the clamp pins being movable in a radial direction of the support disk and having a tapered tip end directed toward the central axis of the support disk, each of the tip ends having two pairs of engagement grooves formed therein; first drive means for driving the clamp pins to move in a direction radially of the support disk by a predetermined radial distance whereby the tapered tip end of each clamp pin is adapted to move into or out of adjacent ones of the U-shaped winding wires; and second drive means for driving the clamp pins to rotate around their longitudinal axis by a predetermined rotational angle whereby the engagement grooves in each clamp pin are adapted to engage corresponding U-shaped winding wires to fixedly clamp them.

In a preferred form, the first drive means comprises: a rotatable plate rotatably mounted on the support disk: first actuator means for rotating the rotatable plate relative to the support disk around the central axis thereof; and a cam mechanism operatively connected with the rotatable plate and the clamp pins for converting a rotary motion of the rotatable plate into a linear motion of each clamp pin.

In another preferred form, the cam mechanism comprises: a plurality of elongated slots formed in the rotatable plate in a circumferentially spaced-apart relation with respect to each other and each having a longitudinal axis disposed at an angle relative to a tangential line of a circle of which center is the axis of rotation of the rotatable plate and which passes through a longitudinal center of the corresponding slot in such a manner that each slot has opposite ends thereof disposed radially inwardly and outwardly, respectively, of the circle; and a plurality of engagement pins each fixedly mounted on a corresponding one of the clamp pins and disposed in a corresponding one of the elongated slots in the rotatable plate for abutting engagement with an inner peripheral wall thereof so that when the rotatable plate is caused to rotate by means of the first actuator, the engagement pins in the elongated slots are caused to move along the slots to thereby drive the clamp pins radially of the support disk.

In a further preferred form, the actuator means comprises: a first actuator; and a first motion-converting means operatively connected with the first actuator and the rotatable plate for converting a linear motion of the first actuator into a rotary motion of the rotatable plate.

In a further preferred form, the first motion-converting means comprises a first rack and pinion mechanism including a first rack operatively connected with the first actuator and a first pinion gear attached to the rotatable plate and being in meshing engagement with the first rack.

In a further preferred form, the second drive means comprises: a ring gear: second actuator means for driving the ring gear to rotate; and a plurality of pinion gears mounted one for each of the clamp pins for integral rotation therewith in such a manner that when the ring gear is driven to rotate by means of the second actuator means, the pinion gears are driven through the ring gear to rotate the clamp pins by a predetermined angle of rotation around the longitudinal axis thereof.

In a further preferred form, the second actuator means comprises: a second actuator; and a second motion-converting means operatively connected with the second actuator and the ring gear for converting a linear motion of the second actuator into a rotary motion of the ring gear.

In a further preferred form, the second motion-converting means comprises a second rack and pinion mechanism including a second rack operatively connected with the second actuator and a second pinion gear attached to the ring gear and being in meshing engagement with the second rack.

In a further preferred form, rotational force transmission means is operatively connected with the pinion gears and the clamp pins for transmitting a rotational force from the pinion gears to the clamp pins while allowing radial movements of the clamp pins relative to the pinion gears.

In a further preferred form, the force transmission means comprises: a longitudinal slot formed through each of the clamp pins along a longitudinal direction thereof; a pin fixed to each of the pinion gears and received in the corresponding elongated throughhole in such a manner that it is movable along the corresponding longitudinal slot in a radial direction of the ring gear to allow a radial motion of an associated clamp pin relative to a corresponding pinion gear but abuts against side walls of the corresponding longitudinal slot to provide integral rotation of the corresponding pinion gear and clamp pin.

In a further preferred form, the tapered end of each of the clamp pins has a tapered and flat configuration with the two pair of engagement grooves formed on opposite sides thereof for receiving the U-shaped winding wires.

In a further preferred form, the clamp pins are disposed in two rows on the opposite sides of the rotatable plate.

In a further preferred form, a support member is provided for supporting thereon the U-shaped winding wires which are disposed in a side-by-side overlapped relation with respect to each other such that the U-shaped winding wires have radially inner legs arranged to form an inner circle and radially outer legs arranged to form an outer circle concentric with the inner circle.

In a further preferred form, a coil guide tool having a plurality of coil guide slots arranged circularly is provided for receiving ends of the winding wires, the coil guide tool being disposed in a face-to-face relation with the support member and being movable relative to the support member.

In a further preferred form, a coil restricting ring is fitted over the outer legs of the winding wires for restricting an outer diameter thereof.

In a further preferred form, the coil restricting ring has a plurality of throughholes arranged circularly through which the tapered tip ends of the clamp pins are adapted to be inserted into the adjacent ones of the circularly arranged inner and outer legs of the U-shaped winding wires.

The above and other objects, features and advantages of the present invention will become apparent from the ensuing detailed description of a preferred embodiment of the invention taken in conjunction with the accompanying drawings.

DETAILED DESCRIPTION OF THE PREFERRED EMBODIMENT

A preferred embodiment of the present invention will now be described below while referring to the accompanying drawings.

Figure 1:
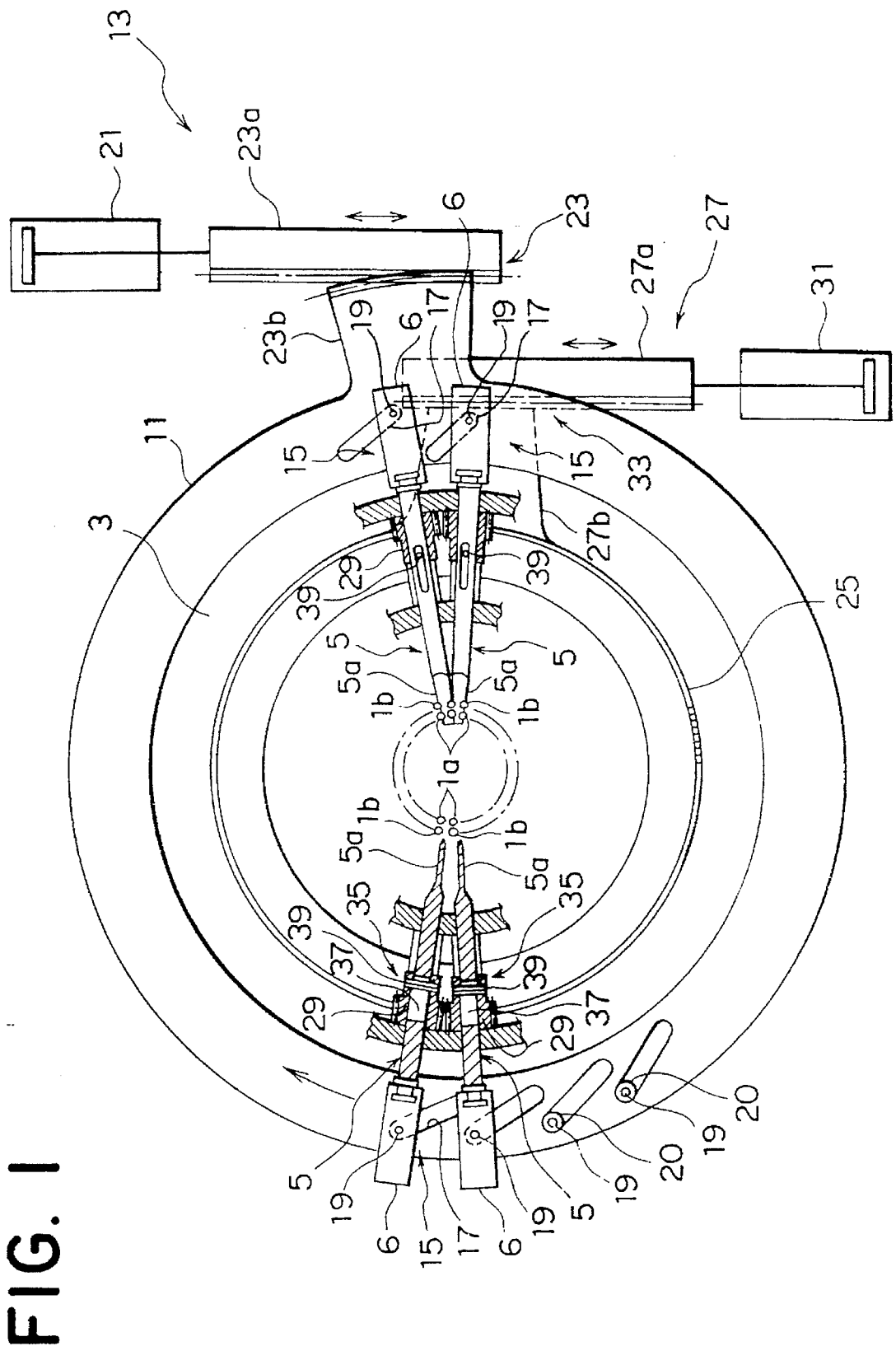
FIG. 1 is a plan view of a clamping apparatus for a coil according to the present invention.
Figure 2:
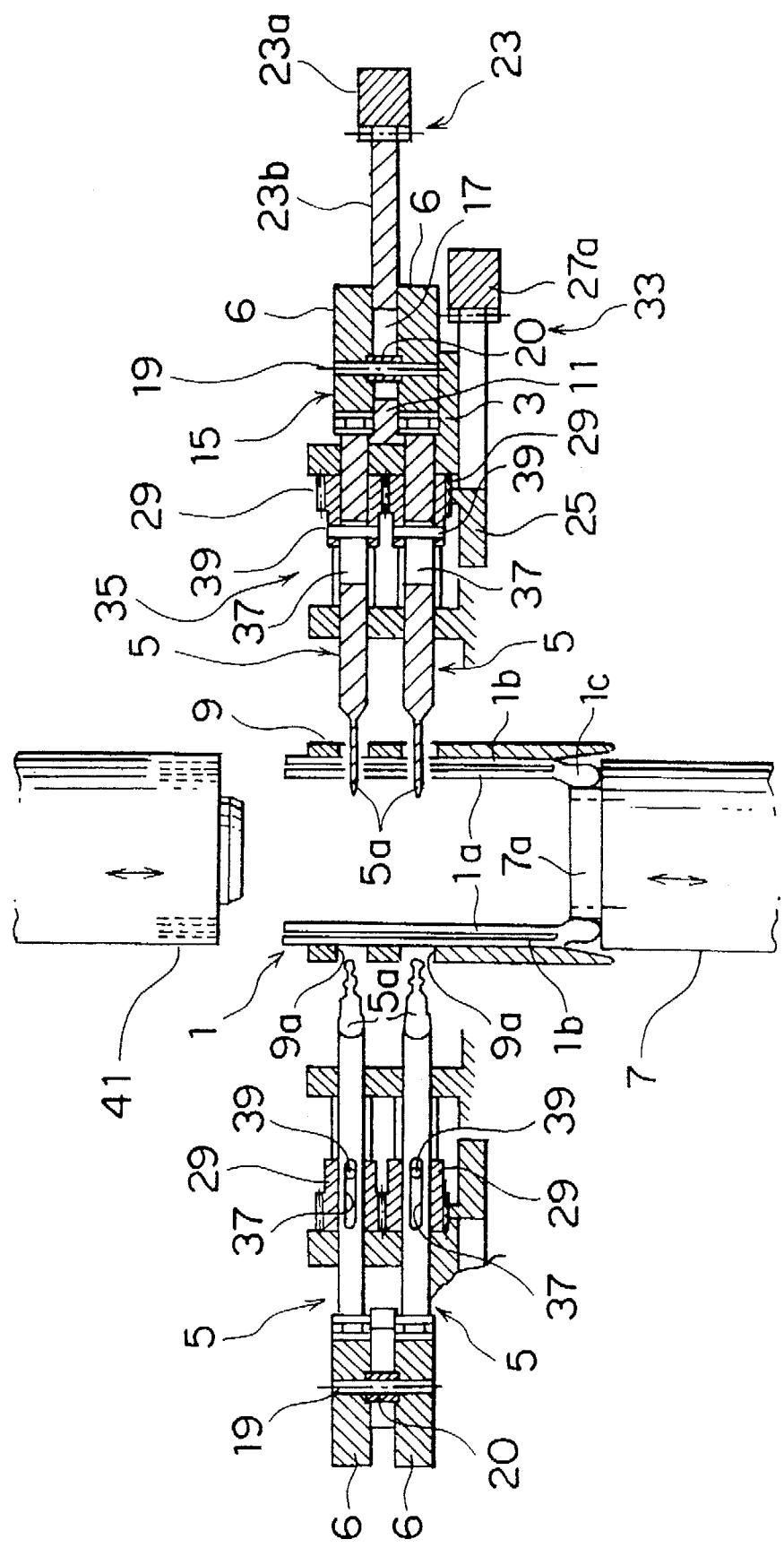
FIG. 2 is a vertical section of the clamping apparatus of FIG. 1.

Referring to the accompanying drawings and first to FIGS. 1 and 2, there is schematically illustrated a clamping apparatus for a coil which is constructed in accordance with principles of the present invention. In this embodiment, the coil to be clamped is an electromagnetic coil in the form of an armature coil for a starter motor of a vehicle and includes a plurality of U-shaped winding wires 1 which are formed of an electrically conductive material such as copper and which are arranged in a circular manner, as illustrated in FIG. 7.

Figure 3:
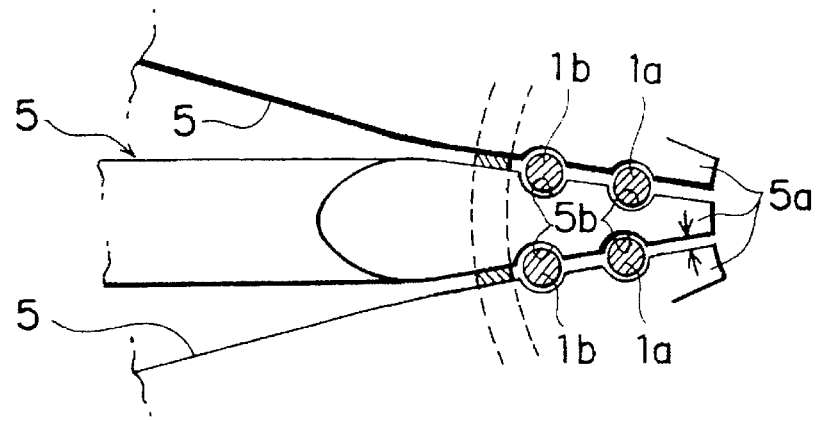
FIG. 3 is an enlarged plan view of tapered tip portions of adjacent clamp pins between which inner and outer legs of wires are firmly clamped.
Figure 4:
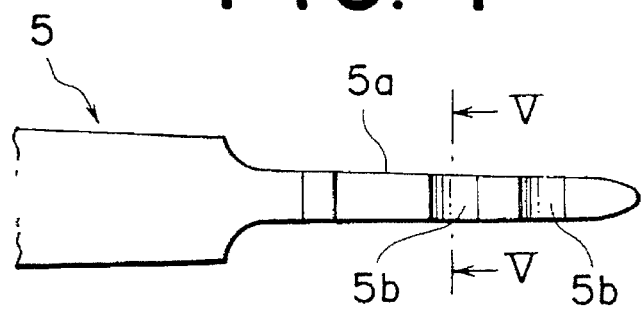
FIG. 4 is a side elevational view of a tapered tip portion of a clamp pin shown in FIG. 3.
Figure 5:
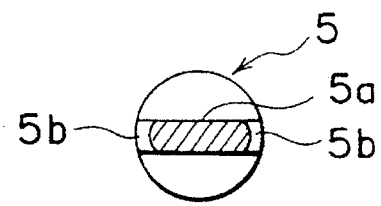
FIG. 5 is a cross-sectional view along line V—V of FIG. 3.
Figure 6:
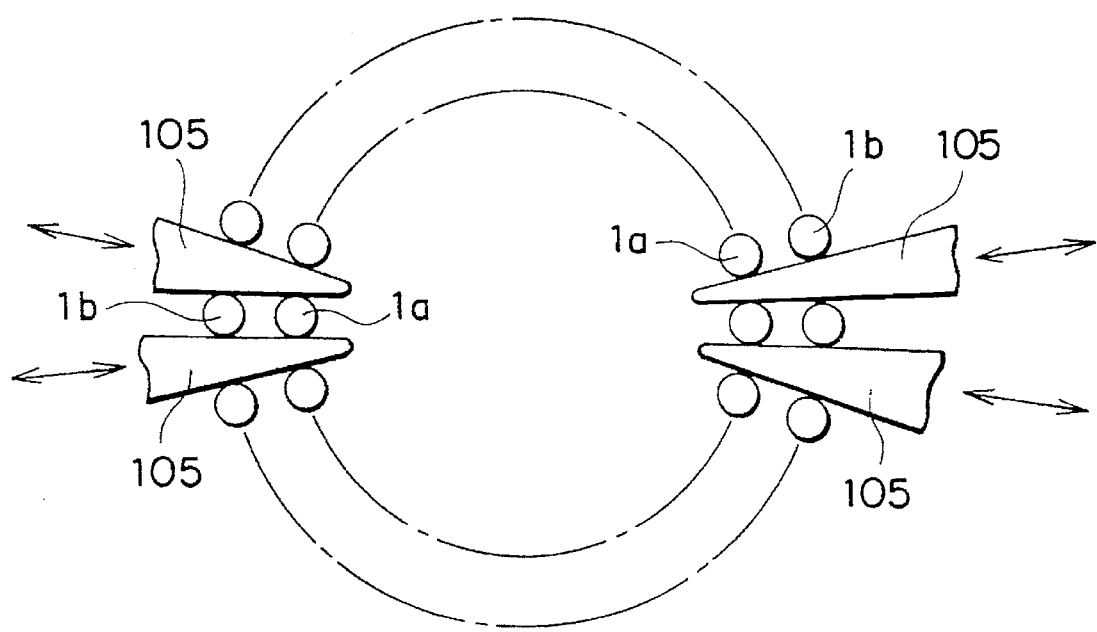
FIG. 6 is a schematic plan view of a conventional clamping apparatus for a coil showing a clamping state in which inner and outer legs of coil wires are clamped between adjacent conical tip portion of clamp pins.

In FIGS. 1 and 2, a support disk 3 having a central axis is mounted on an unillustrated frame. A plurality of clamp pins 5 are mounted on the support disk 3 for rotation relative thereto and spaced from each other with predetermined circumferential intervals. In the illustrated embodiment, the clamp pins 5 are disposed in two rows on the support disk 3. Each of the clamp pins 5 is movable in a radial direction of the support disk 3 and has a tip end 5a directed toward the center of the support disk 3, each of the tip end 5a having two pairs of engagement grooves 5b formed on the opposite side edges thereof, as clearly seen from FIGS. 3 through 5. The tip end 5a of each of the clamp pins 5 has a tapered and flat configuration (i.e., tapered in plan view as shown in FIG. 3 and flat in side and end views as shown in FIGS. 4 and 5) with two pair of engagement grooves 5b formed on opposite sides thereof for receiving and engaging the U-shaped winding wires 1.

Figure 7:
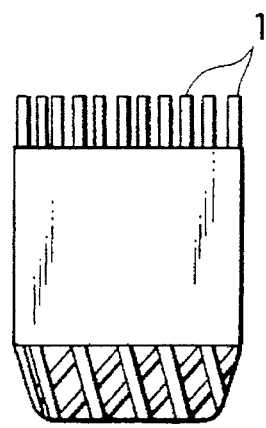
FIG. 7 is a side elevational view of pre-assembled U-shaped coil wires.

The U-shaped winding wires 1 are disposed in a side-by-side overlapped relation with respect to each other, as shown in FIG. 7, and they are supported on a support member 7 in such a manner that the U-shaped winding wires 1 have radially inner first legs 1a arranged to form an inner circle, and radially outer second legs 1b arranged to form an outer circle concentric with the inner circle, as illustrated in FIG. 1.

As seen from FIG. 2, the support member 7 is in the form of a cylinder with a circular projection 7a of a reduced diameter integrally formed therewith at one end thereof. The support member 7 is moved vertically by means of an unillustrated drive means. The U-shaped wire 1 are disposed at their bottom or bridge portions 1c on the end surface of the cylindrical support member 7 around its round projection 7a. A coil restricting ring 9 is fitted over the outer legs 1a of the U-shaped wires 1 to restrict an outer shape or an outer diameter thereof.

The coil restricting ring 9 has a plurality of throughholes 9a through which the tip ends 5a of the clamp pins 5 are adapted to be inserted respectively into the adjacent ones of the circulary arranged inner and outer legs 1a, 1b of the U-shaped winding wires 1. In this embodiment, the throughholes 9a are disposed in two rows spaced apart from each other axially of the coil restricting ring 9, one row corresponding to a first or upper row of clamp pins 5 and the other row corresponding to a second or lower row of clamp pins 5.

A first drive means drives the clamp pins 5 to move in directions radially of the support disk 3 by a predetermined radial distance whereby the tapered tip end 5a of each clamp pin 5 is adapted to move into or out of adjacent ones of the U-shaped winding wires 1.

The first drive means comprises a rotatable plate 11 rotatably mounted on the support disk 3, a first actuator means 13 for rotating the rotatable plate 11 relative to the support disk 3 around the central axis thereof, and a cam mechanism 15 operatively connected with the rotatable plate 11 and the clamp pins 5 for converting a rotary motion of the rotatable plate 11 into linear motions of the clamp pins 5.

The cam mechanism 15 comprises a plurality of elongated slots 17 formed in the rotatable plate 11 in a circumferentially spaced-apart relation with respect to each other, and a plurality of engagement pins 19 each fixedly mounted on a corresponding one of the clamp pins 5 and disposed in a corresponding one of the elongated slots 17 in the rotatable plate 11 for abutting engagement with an inner peripheral wall thereof. More specifically, each engagement pin 19 is fixed at its opposite ends to a pair of sliders 6 which are disposed on the opposite sides of the rotatable plate 11 for sliding movement relative thereto. Each slider 6 is fixedly attached to a radially outer end of an associated clamp pin 5, but may instead be formed integral with the clamp pin 5. Thus, each slider 6 can be construed as part of an associated clamp pin 5. A bush 20 is fitted on each engagement pin 19 for abutting engagement with an inner wall of an associated elongated slot 17.

Each of the elongated slots 17 has a longitudinal axis disposed at an angle relative to a tangential line of a circle whose center is the axis of rotation of the rotatable plate 11 and which passes through a longitudinal center of the corresponding slot 17 in such a manner that each slot 17 has opposite ends thereof disposed radially inwardly and outwardly, respectively, of the circle. In other words, each elongated slot 17 is arranged such that its longitudinal axis crosses the tangential line of the circle that passes through the longitudinal center of the associated elongated slot 17.

With the above arrangement, when the rotatable plate 11 is caused to rotate by the first actuator means 13, the engagement pins 19 in the elongated slots 17 are caused to move along the slots 17 to thereby drive the clamp pins 5 radially of the support disk 3.

The first actuator means 13 comprises a first actuator cylinder in the form of a first air cylinder 21, and a first motion-converting means in the form of a rack and pinion mechanism 23 operatively connected with the first air cylinder 21 and the rotatable plate 11 for converting a linear motion of the first air cylinder 21 into a rotary motion of the rotatable plate 11.

The first rack and pinion mechanism 23 comprises a rack 23a operatively connected at its one end with a piston rod of the first air cylinder 21, and a pinion gear 23b integrally formed with the rotatable plate 11 and extending radially from the outer periphery thereof, the pinion gear 23b being in meshing-engagement with the rack 23a such that when the rack 23a is linearly driven to move by means of the air cylinder 21, the pinion gear 23b meshing with the rack 23a is moved or rotated together with the rotatable disk 11 in a clockwise or counterclockwise direction in FIG. 1.

A second drive means drives the clamp pins 5 to rotate around their longitudinal axis by a predetermined rotational angle (e.g., 90 degrees in the illustrated embodiment) whereby the engagement grooves 5b in the clamp pin 5 are adapted to engage corresponding U-shaped winding wires 1 to firmly clamp them.

The second drive means comprises a ring gear 25 rotatably supported on the unillustrated support frame, a second actuator means 27 operatively connected with the ring gear 25 for driving it to rotate, and a plurality of pinion gears 29 mounted one for each of the clamp pins 5 for integral rotation therewith and for axial movement relative thereto. Each pinion gear 29 on a first or lower row of a clamp pin 5 is in meshing engagement with the ring gear 25 and a corresponding pinion gear 29 on a second or upper row of clamp pin 5 in such a manner that when the ring gear 25 is driven to rotate by virtue of the second actuator means 27, each of the pinion gears 29 is driven through the ring gear 25 to rotate a corresponding one of the clamp pins 5 by a predetermined angle of rotation around the longitudinal axis thereof.

The second actuator means 27 comprises a second actuator cylinder in the form of a second air cylinder 31, and a second motion-converting means in the form of a rack and pinion mechanism 33 operatively connected with the second air cylinder 31 and the ring gear 25 for converting a linear motion of the second air cylinder 31 into a rotary motion of the ring gear 25.

The second rack and pinion mechanism 27 comprises a rack 27a operatively connected at its one end with a piston rod of the second air cylinder 31, and a pinion gear 27b integrally formed with the ring gear 25 and extending radially from the outer periphery thereof, the pinion gear 27b being in meshing engagement with the rack 27a such that when the rack 27a is linearly driven to move by means of the second air cylinder 31, the pinion gear 27b meshing with the rack 27a is moved or rotated together with the ring gear 25 in a clockwise or counterclockwise direction in FIG. 1.

A rotational force transmission means 35 is disposed between each pinion gear 29 and a clamp pin 5 associated therewith for transmitting a rotational force from each pinion gear 29 to the associated clamp pin 5 while allowing a radial movement of the clamp pin 5 relative to the pinion gear 29. The rotational force transmission means 35 comprises an elongated longitudinal slot 37 formed diametrally through each of the clamp pins 5 along a longitudinal direction thereof, a pin 39 fixed at its opposite ends to each of the pinion gears 29 and extending through and received in the corresponding longitudinal slot 37 in such a manner that it is movable within the corresponding longitudinal slot 37 in a radial direction of the ring gear 25 to allow a radial motion of an associated clamp pin 5 relative thereto but abuts against side walls of the corresponding longitudinal slot 37 to provide integral rotation of the corresponding pinion gear 29 and clamp pin 5.

Though not illustrated, in place of the pin and slot mechanism described above, the rotational force transmission means 35 can take the form of a spline coupling which comprises a plurality of axially extending spline teeth formed on the outer peripheral surface of each clamp pin 5 in a circumferentially spaced-apart relation with respect to each other, and a plurality of spline grooves formed in the inner peripheral surface of each pinion gear 29 and engaged with the spline teeth of an associated clamp pin 5 to thereby restrict or block relative rotation of each pinion gear 29 and its associated clamp pin 5, while allowing a relative axial sliding motion therebetween, A coil guide tool 41 having a plurality of coil guide slots circularly arranged along two concentric circles is disposed above the cylindrical support member 7 in a face-to-face relation and adapted to be vertically moved toward or away from the support member 7 in synchronization with the vertical movement of the latter, by virtue of an unillustrated drive means so that the upper ends of the pre-assembled winding wires 1 are inserted into the corresponding coil guide slots in the coil guide tool 41.

In operation, the pre-assembled winding wires 1 are first placed on an upper end of the cylindrical support member 7 and fitted on the round projection 7a, and then the coil restricting ring 9 is fitted on the pre-assembled winding wires 1 thus mounted on the support member 7, as shown in FIG. 2. In this regard, instead of the above procedure, the pre-assembled winging wires 1 with the coil restricting ring 9 fitted thereon can be mounted or fitted on the round projection 7a of the support member 7. Then, the support member 7 is moved to properly position the coil restricting ring 9 so that the upper and lower throughholes 9a in the ring 9 are placed in register or match with the upper and lower rows of clamp pins 5, respectively. During the vertical movement of the support member 7, the coil guide tool 41 is also synchronized to move down toward the support member 7 so that the upper ends of the pre-assembled winding wires 1 are inserted into the corresponding coil guide slots in the coil guide tool 41. Thereafter, the support member 7 is held stationary and the coil guide tool 41 is moved upward, with the pre-assembled winding wires 1 being prevented from its upward movement by means of an unillustrated coil upward-movement suppression member, to such a position as to expose the throughholes 9a in the coil restricting ring 9 so that the clamp pins 5 can be inserted into the throughholes 9a.

Subsequently, the first air cylinder 21, which is normally in a retracted position, is actuated to extend so that the rotatable plate 11 is thereby driven to rotate in a clockwise direction in FIG. 1 through the action of the first rack and pinion mechanism 23. With the clockwise rotation of the rotatable plate 11, the engagement pins 19 are caused to move along an outer peripheral wall of the associated elongated slots 17 in a direction radially inward of the rotatable plate 11, whereby the sliders 6 are moved radially inward along the engagement pins 19 to push the clamp pins 5 into adjacent ones of the pre-assembled winding wires 1 on the support member 7 through the throughholes 9a in the coil restricting ring 9. At this time, the clamp pins 5 are held such that the tapered flat tip ends 5a thereof are directed vertically, i.e., the opposite side edges thereof are disposed vertically as shown at the left-hand clamp pins 5 in FIG. 1.

Thereafter, the second air cylinder 31, which is normally in a retracted state, is actuated to extend, so that the ring gear 25 is caused to rotate in a counterclockwise direction through the action of the second rack and pinion mechanism 33, thereby rotating the pinion gears 29 on the clamp pins 5. With the rotation of the pinion gears 29, the clamp pins 5 are caused to rotate therewith through the intermediary of the rotational force transmission means 35 by an angle of rotation of about 90 degrees into their clamping positions, as shown at the right-hand clamp pins 5 in FIG. 1, in which the tapered flat tip ends 5a thereof are horizontal or flat, i.e., the flat surfaces thereof are horizontal or on a plane perpendicular to the pre-assembled winding wires 1 in the coil restricting ring 7. In this state, the pre-assembled winding wires 1 are respectively received and firmly clamped in the associated grooves 5b in the tapered flat ends 5a of the clamp pins 5, as clearly shown on an enlarged scale in FIG. 3, so that they are fixedly held in place at precise positions by the clamp pins 5.

The coil guide tool 41 is then moved upward together with the unillustrated coil upward-movement suppression member so as to be removed from the pre-assembled winding wires 1.

With the pre-assembled winding wires 1 being thus clampingly held on the support member 7 at their precise locations, an unillustrated iron core having a plurality of coil slots is properly adjusted in position relative to the pre-assembled winding wires 1 and moved down toward the support member 7 manually or by means of an unillustrated assembling tool so that the winding wires 1 can be smoothly inserted into the corresponding coil slots in the iron core in an extremely efficient and easy manner. Once the upper ends of the winding wires 1 have been inserted into the coil slots a predetermined limited length, the second air cylinder 31 is deactuated to retract whereby the clamp pins 5 are caused to rotate an angle of 90 degrees through the intermediary of the second rack and pinion mechanism 27 and the rotational force transmission means 35. Then, the first air cylinder 21 is also deactuated to retract whereby the clamp pins 5 are caused to move radially outward to recede from the winding wires 1 through the intermediary of the first rack and pinion mechanism 23 and the cam mechanism 15. Thereafter, the iron core is further moved downward until it abuts against the upper end or the round projection 7a of the support member 7 so that the pre-assembled winding wires 1 are completely inserted into the iron core 41. Finally, the iron core 41 with the winding wires 1 thus assembled is removed from the support member 7 for subsequent processing.

As apparent from the foregoing, according to the present invention, the pre-assembled winding wires 1 are clampingly held at predetermined precise positions by means of the plurality of clamp pins 5 so that the relative positions between the pre-assembled winding wires 1 and an iron core can be set with a high degree of preciseness. This serves to prevent not only improper insertion of the winding wires 1 into the coil slots in the iron core, but also deformations or damage to the winding wires 1.

Although a preferred embodiment of the present invention has been described herein and shown in the accompanying drawings, various changes or modifications can be made within the scope of the appended claims without departing from the true spirits of the invention. Thus, in place of the air cylinders 21, 31 and the rack and pinion mechanisms 23, 27, the actuator means 13, 27 can be constructed otherwise, for example, by a motor such as a stepping motor which is operatively connected with the rotatable plate 11. Furthermore, In the above-described embodiment, two (upper and lower) rows of clamp pins 5 are employed, but a single row of clamp pins 5 can be used as necessary.

What is claimed is:

1. A clamping apparatus for a coil having a plurality of generally U-shaped winding wires comprising:

a support disk having a central axis;

a plurality of clamp pins disposed on said support disk for rotation relative thereto and spaced from each other with predetermined circumferential intervals, each of said clamp pins being movable in a radial direction of said support disk and having a tapered tip end directed toward the central axis of said support disk, each of said tip ends having two pairs of engagement grooves formed therein;

first drive means for driving said clamp pins to move in a direction radially of said support disk by a predetermined radial distance whereby the tapered tip end of each clamp pin is adapted to move into or out of adjacent ones of said U-shaped winding wires; and second drive means for driving said clamp pins to rotate around their longitudinal axis by a predetermined rotational angle whereby the engagement grooves in each clamp pin are adapted to engage corresponding U-shaped winding wires to fixedly clamp them.

2. A clamping apparatus according to claim 1, wherein said first drive means comprises:

a rotatable plate rotatably mounted on said support disk:
first actuator means for rotating said rotatable plate relative to said support disk around the central axis thereof; and
a cam mechanism operatively connected with said rotatable plate and said clamp pins for converting a rotary motion of said rotatable plate into a linear motion of each clamp pin.

3. A clamping apparatus according to claim 2, wherein said cam mechanism comprises:

a plurality of elongated slots formed in said rotatable plate in a circumferentially spaced-apart relation with respect to each other and each having a longitudinal axis disposed at an angle relative to a tangential line of a circle of which center is the axis of rotation of said rotatable plate and which passes through a longitudinal center of the corresponding slot in such a manner that each slot has opposite ends thereof disposed radially inwardly and outwardly, respectively, of said circle; and
a plurality of engagement pins each fixedly mounted on a corresponding one of said clamp pins and disposed in a corresponding one of said elongated slots in said rotatable plate for abutting engagement with an inner peripheral wall thereof so that when said rotatable plate is caused to rotate by means of said first actuator, said engagement pins in said elongated slots are caused to move along said slots to thereby drive said clamp pins radially of said support disk.

4. A clamping apparatus according to claim 2, wherein said first actuator means comprises:

a first actuator; and
a first motion-converting means operatively connected with said first actuator and said rotatable plate for converting a linear motion of said first actuator into a rotary motion of said rotatable plate.

5. A clamping apparatus according to claim 4, wherein said first motion-converting means comprises a first rack and pin ion mechanism including a first rack operatively connected with said first actuator and a first pinion gear attached to said rotatable plate and being in meshing engagement with said first rack.

6. A clamping apparatus according to claim 2, wherein said clamp pins are disposed in two rows on the opposite sides of said rotatable plate.

7. A clamping apparatus according to claim 1, wherein said second drive means comprises:

a ring gear;
second actuator means for driving said ring gear to rotate; and
a plurality of pinion gears mounted one for each of said clamp pins for integral rotation therewith in such a manner that when said ring gear is driven to rotate by means of said second actuator means, said pinion gears are driven through said ring gear to rotate said clamp pins by a predetermined angle of rotation around each clamp pin's longitudinal axis.

8. A clamping apparatus according to claim 7, wherein said second actuator means comprises:

a second actuator; and
a second motion-converting means operatively connected with said second actuator and said ring gear for converting a linear motion of said second actuator into a rotary motion of said ring gear.

9. A clamping apparatus according to claim 8, wherein said second motion-converting means comprises a second rack and pinion mechanism including a second rack operatively connected with said second actuator and a second pinion gear attached to said ring gear and being in meshing engagement with said second rack.

10. A clamping apparatus according to claim 7, further comprising rotational force transmission means operatively connected with said pinion gears and said clamp pins for transmitting a rotational force from said pinion gears to said clamp pins while allowing radial movements of said clamp pins relative to said pinion gears.

11. A clamping apparatus according to claim 10, wherein said rotational force transmission means comprises:

a longitudinal slot formed through each of said clamp pins along a longitudinal direction thereof;
a pin fixed to each of said pinion gears and received in said corresponding longitudinal slot in such a manner that it is movable along said corresponding longitudinal slot in a radial direction of said ring gear to allow a radial motion of an associated clamp pin relative to a corresponding pinion gear but abuts against side walls of said corresponding longitudinal slot to provide integral rotation of said corresponding pinion gear and clamp pin.

12. A clamping apparatus according to claim 1, wherein the tapered end of each of said clamp pins has a tapered and flat configuration with said two pairs of engagement grooves formed on opposite sides thereof for receiving the U-shaped winding wires.

13. A clamping apparatus according to claim 1, wherein said clamp pins are disposed in two rows on the opposite sides of rotatable plate.

14. A clamping apparatus according to claim 1, further comprising a support member for supporting thereon said U-shaped winding wires which are disposed in a side-by-side overlapped relation with respect to each other such that said U-shaped winding wires have radially inner legs arranged to form an inner circle and radially outer legs arranged to form an outer circle concentric with said inner circle.

15. A clamping apparatus according to claim 14, further comprising a coil guide tool having a plurality of coil guide slots arranged circularly for receiving ends of said winding wires, said coil guide tool being disposed in a face-to-face relation with said support member and being movable relative to said support member.

16. A clamping apparatus according to 14, further comprising a coil restricting ring fitted over said outer legs of said winding wires for restricting an outer diameter thereof.

17. A clamping apparatus according to claim 16, wherein said coil restricting ring has a plurality of throughholes arranged circularly through which the tapered tip ends of said clamp pins are adapted to be inserted into the adjacent ones of said circularly arranged inner and outer legs of said U-shaped winding wires.

18. A clamping apparatus according to claim 1, further comprising a coil restricting ring fitted over outer legs of said winding wires for restricting an outer diameter thereof.

19. A clamping apparatus according to claim 18, wherein said coil restricting ring has a plurality of throughholes arranged circularly through which the tapered tip ends of said clamp pins are adapted to be inserted into the adjacent ones of circularly arranged inner legs and said outer legs of said U-shaped winding wires.

* * * * *